US007766749B2

(12) United States Patent
Giobbi

(10) Patent No.: US 7,766,749 B2
(45) Date of Patent: Aug. 3, 2010

(54) CENTRALIZED GAMING SYSTEM WITH MODIFIABLE REMOTE DISPLAY TERMINALS

(75) Inventor: John J. Giobbi, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 1837 days.

(21) Appl. No.: 10/812,333

(22) Filed: Mar. 29, 2004

(65) Prior Publication Data

US 2004/0180722 A1 Sep. 16, 2004

Related U.S. Application Data

(63) Continuation of application No. 09/778,351, filed on Feb. 7, 2001, now Pat. No. 6,749,510.

(51) Int. Cl.
*A63F 13/00* (2006.01)
*A63F 9/24* (2006.01)
*A63F 13/12* (2006.01)
*A63B 71/06* (2006.01)

(52) U.S. Cl. .............................. 463/42; 463/29; 463/30; 273/138.1; 273/139; 273/453; 273/461

(58) Field of Classification Search ..................... 463/7, 463/15–23, 29–38, 42, 1, 10–14, 25–27; 273/143 R, 138.1, 138.2, 139, 141 A, 142 B, 273/142 C, 142 J, 317.1, 453, 460–461
See application file for complete search history.

(56) References Cited

U.S. PATENT DOCUMENTS 4,335,809 A 6/1982 Wain .......................... 194/1 R
4,494,197 A 1/1985 Troy et al. .................. 364/412
4,624,462 A 11/1986 Itkis ........................... 273/237

(Continued)

FOREIGN PATENT DOCUMENTS

EP 0 450 520 A2 3/1991

(Continued)

OTHER PUBLICATIONS

Supplementary European Search Report for Application No. EP 95 93 7249, dated Apr. 27, 2000 (2 pages).

*Primary Examiner*—Peter DungBa Vo
*Assistant Examiner*—Arthur O. Hall
(74) *Attorney, Agent, or Firm*—Nixon Peabody LLP

(57) ABSTRACT

A centralized gaming system comprises a central server system and a plurality of display terminals remote from and linked to the central server system. The central server system includes a master game server, a game execution server, and a database server. The master game server stores a plurality of games of chance. Each game includes respective game play software and respective audiovisual software. In response to one of the games being selected for play at one of the display terminals, the game play software for the selected game is loaded from the master game server into the game execution server and is executed by the game execution server to randomly select an outcome. The audiovisual software for the selected game is selectively executed at the display terminal to visually represent the outcome on a display of the display terminal. The database server collects game activity data based on the outcome and maintains such data for report generation and player tracking purposes. The master game server may evaluate the collected game activity data and, in turn, modify one or more of the display terminals for maximizing earnings and target marketing.

14 Claims, 4 Drawing Sheets

U.S. PATENT DOCUMENTS

| | | | | | |
|---|---|---|---|---|---|
| 4,652,998 | A | | 3/1987 | Koza et al. | 364/412 |
| 4,856,787 | A | | 8/1989 | Itkis | 273/237 |
| 5,083,271 | A | | 1/1992 | Thacher et al. | 364/411 |
| 5,326,104 | A | | 7/1994 | Pease et al. | 273/138 |
| 5,412,404 | A | * | 5/1995 | Candy | 345/211 |
| 5,429,361 | A | * | 7/1995 | Raven et al. | 463/25 |
| 5,560,603 | A | | 10/1996 | Seelig et al. | 463/6 |
| 5,575,717 | A | * | 11/1996 | Houriet et al. | 463/1 |
| 5,586,937 | A | | 12/1996 | Menashe | 463/41 |
| 5,655,961 | A | | 8/1997 | Acres et al. | 463/27 |
| 5,664,998 | A | | 9/1997 | Seelig et al. | 463/20 |
| 5,702,304 | A | | 12/1997 | Acres et al. | 463/29 |
| 5,707,286 | A | | 1/1998 | Carlson | 463/16 |
| 5,741,183 | A | | 4/1998 | Acres et al. | 463/42 |
| 5,752,160 | A | * | 5/1998 | Dunn | 725/93 |
| 5,752,882 | A | | 5/1998 | Acres et al. | 463/42 |
| 5,759,102 | A | | 6/1998 | Pease et al. | 463/42 |
| 5,779,545 | A | | 7/1998 | Berg et al. | 463/22 |
| 5,796,945 | A | * | 8/1998 | Tarabella | 709/219 |
| 5,820,459 | A | | 10/1998 | Acres et al. | 463/25 |
| 5,836,817 | A | | 11/1998 | Acres et al. | 463/26 |
| 5,913,040 | A | * | 6/1999 | Rakavy et al. | 709/232 |
| 5,917,725 | A | | 6/1999 | Thacher et al. | 364/410.1 |
| 5,971,849 | A | * | 10/1999 | Falciglia | 463/16 |
| 5,999,808 | A | | 12/1999 | LaDue | 455/412 |
| 6,001,016 | A | | 12/1999 | Walker et al. | 463/42 |
| 6,068,552 | A | | 5/2000 | Walker et al. | 463/21 |
| 6,089,975 | A | * | 7/2000 | Dunn | 463/16 |
| 6,089,982 | A | | 7/2000 | Holch et al. | 463/42 |
| 6,110,041 | A | | 8/2000 | Walker et al. | 463/20 |
| 6,117,013 | A | | 9/2000 | Eiba | 463/41 |
| 6,135,887 | A | | 10/2000 | Pease et al. | 463/42 |
| 6,162,122 | A | | 12/2000 | Acres et al. | 463/29 |
| 6,210,274 | B1 | | 4/2001 | Carlson | 463/16 |
| 6,224,485 | B1 | * | 5/2001 | Dickinson et al. | 463/30 |
| 6,264,561 | B1 | * | 7/2001 | Saffari et al. | 463/42 |
| 6,272,223 | B1 | | 8/2001 | Carlson | 380/251 |
| 6,287,200 | B1 | | 9/2001 | Sharma | 463/40 |
| 6,346,048 | B1 | * | 2/2002 | Ogawa et al. | 463/42 |
| 6,354,946 | B1 | | 3/2002 | Finn | 463/40 |
| 6,402,614 | B1 | | 6/2002 | Schneier et al. | 463/17 |
| 6,402,618 | B1 | * | 6/2002 | Reed et al. | 463/40 |
| 6,409,602 | B1 | | 6/2002 | Wiltshire et al. | 463/42 |
| 6,425,828 | B2 | | 7/2002 | Walker et al. | 463/42 |
| 6,428,413 | B1 | | 8/2002 | Carlson | 463/16 |
| 6,450,887 | B1 | | 9/2002 | Mir et al. | 463/42 |
| 6,454,649 | B1 | * | 9/2002 | Mattice et al. | 463/17 |
| 6,508,709 | B1 | * | 1/2003 | Karmarkar | 463/42 |
| 6,605,003 | B2 | * | 8/2003 | Suchocki et al. | 463/29 |
| 6,961,747 | B2 | * | 11/2005 | Sakaguchi et al. | 709/201 |
| 6,986,055 | B2 | | 1/2006 | Carlson | 713/200 |
| 7,260,834 | B1 | | 8/2007 | Carlson | 726/4 |
| 7,676,822 | B2 | * | 3/2010 | Forler et al. | 725/32 |
| 2001/0044337 | A1 | | 11/2001 | Rowe et al. | 463/29 |
| 2002/0045484 | A1 | | 4/2002 | Eck et al. | 463/42 |
| 2002/0068631 | A1 | | 6/2002 | Raverdy et al. | 463/42 |
| 2002/0071557 | A1 | | 6/2002 | Nguyen | 380/251 |
| 2002/0116615 | A1 | | 8/2002 | Nguyen et al. | 713/168 |
| 2002/0137217 | A1 | | 9/2002 | Rowe | 436/42 |
| 2002/0138594 | A1 | | 9/2002 | Rowe | 709/219 |
| 2004/0209660 | A1 | | 10/2004 | Carlson et al. | 463/1 |
| 2005/0193209 | A1 | | 9/2005 | Saunders et al. | 713/182 |
| 2006/0165235 | A1 | | 7/2006 | Carlson | 380/268 |

FOREIGN PATENT DOCUMENTS

| | | | | |
|---|---|---|---|---|
| EP | 0 450 520 | A3 | | 3/1991 |
| EP | 0 556 840 | A2 | | 8/1993 |
| EP | 0 556 840 | A3 | | 8/1993 |
| EP | 0 843 272 | A1 | | 5/1998 |
| EP | 1 004 970 | A2 | | 5/2000 |
| EP | 0 620 688 | B1 | | 6/2000 |
| EP | 0 556 840 | B1 | | 8/2000 |
| GB | 2086115 | A | * | 5/1982 |
| GB | 2 151 054 | A | | 10/1983 |
| GB | 2253325 | A | * | 9/1992 |
| WO | WO 9214526 | A1 | * | 9/1992 |
| WO | WO 94/20179 | | | 9/1994 |
| WO | WO 98/35309 | | | 8/1998 |
| WO | WO 99/41718 | | | 8/1999 |
| WO | WO 00/25281 | | | 5/2000 |
| WO | WO 00/30729 | | * | 6/2000 |

* cited by examiner

CENTRALIZED GAMING SYSTEM WITH MODIFIABLE REMOTE DISPLAY TERMINALS

RELATED APPLICATION

This application is a continuation of U.S. patent application Ser. No. 09/778,351, filed Feb. 7, 2001, now U.S. Pat. No. 6,749,510.

FIELD OF THE INVENTION

The present invention relates generally to gaming systems and, more particularly, to a centralized gaming system with modifiable remote display terminals.

BACKGROUND OF THE INVENTION

Heretofore, gaming systems have generally been decentralized despite the presence of a central server. In such systems, the central server is linked to a plurality of gaming machines. In response to a wager, the gaming machines execute game software to randomly select an outcome and awarding an appropriate payout based on the outcome. The game software resides in memory located within the gaming machines. Accounting meters and a random number generator may reside in either the machines or the central server. The above-described arrangement suffers from numerous drawbacks.

First, if a gaming machine malfunctions and/or suffers an unplanned power loss, game activity data at the time of power loss can be difficult to precisely track. Untracked data may void a payout for a valid outcome that occurred just prior to the loss of power. Also, because the game software resides in the gaming machine, the gaming machine must be re-booted and must initialize the game software when brought back online.

Second, because live and historical outcome data are stored in the gaming machine, it can be difficult to generate reports concerning the activity of each gaming machine. Such data must be individually downloaded from each gaming machine. To generate a comprehensive report of all gaming machines, the downloaded data must then be combined.

Third, techniques for modifying or replacing the game software in the gaming machines are generally inconvenient, time-consuming, and expensive. In one technique, the entire machine is disconnected from the central server and replaced with a new machine. This involves the shipment of machines to and from a gaming establishment and requires the services of an appreciable number of skilled and semi-skilled service personnel. The service personnel must identify the machines to be replaced, locate the machines on the gaming establishment floor, and then replace the existing machines with the new machines. In another technique, the memory chip(s) containing the software is replaced with new software. Once again, the service personnel must identify the machines to receive the new memory chip(s), locate the machines on the gaming establishment floor, and then replace the existing memory chip(s) with the new memory chip(s). Also, any game-specific elements (e.g., artwork, button labels, etc.) must be replaced so that the machine is tailored to the new software. In yet another technique, the new software can be downloaded to the gaming machine from either the central server or a personal computer temporarily linked to the gaming machine. This downloading technique facilitates modifications to the game software in that it does not require removal of the gaming machine and does not require service personnel to visit the gaming machine site or the gaming machine itself. Nonetheless, the procedure for downloading the new game software to the gaming machine across a communications link can be time-consuming and subject to security concerns. The machine is generally out of service and therefore not generating any revenues during the time at which the new software is being downloaded. Also, regulated gaming jurisdictions may be reluctant to permit new software to be downloaded to the gaming machine without some assurance that the downloaded software complies with local regulations. Therefore, the downloaded software may need to be verified and authenticated:

Fourth, decentralized gaming systems typically limit the games available for play on each gaming machine. Because different casino players are attracted to different types of games of chance, a player may find it difficult to locate a gaming machine configured to play his/her preferred game. Heretofore, the player generally has had to walk around and search the casino floor for the preferred gaming machine. If the player is part of a group and different members of the group wish to play different games, the members of the group have had to split up to play their preferred games.

Although more centralized gaming systems have heretofore been proposed, such proposed systems have merely included a central game bank containing multiple gaming machines playable with handheld units plugged into "plug and play pods" remote from the central game bank. If one of the gaming machines in the central game bank is being used by one of the remote handheld units, the system does not allow that gaming machine to be selected by another of the remote handheld units for play at the same time. Thus, the central game bank is not a true multi-user game server, but rather provides a limited one-on-one system where each gaming machine in the central game bank can only be used by one of the remote handheld units at a time.

A need therefore exists for a centralized gaming system that overcomes one or more of the aforementioned shortcomings associated with existing gaming systems.

SUMMARY OF THE INVENTION

In accordance with the present invention, a centralized gaming system comprises a central server system and a plurality of display terminals remote from and linked to the central server system. The central server system includes a master game server, a game execution server, and a database server. The master game server stores a plurality of games of chance. Each game includes respective game play software and respective audiovisual software. In response to one of the games being selected for play at one of the display terminals, the game play software for the selected game is loaded from the master game server into the game execution server and is executed by the game execution server to randomly select an outcome. The audiovisual software for the selected game is selectively executed at the display terminal to visually represent the outcome on a display of the display terminal. The database server collects game activity data based on the outcome and maintains such data for report generation and player tracking purposes. The master game server may evaluate the collected game activity data and, in turn, modify one or more of the display terminals for maximizing earnings and target marketing.

BRIEF DESCRIPTION OF THE DRAWINGS

The foregoing and other advantages of the invention will become apparent upon reading the following detailed description and upon reference to the drawings.

Figure 1:
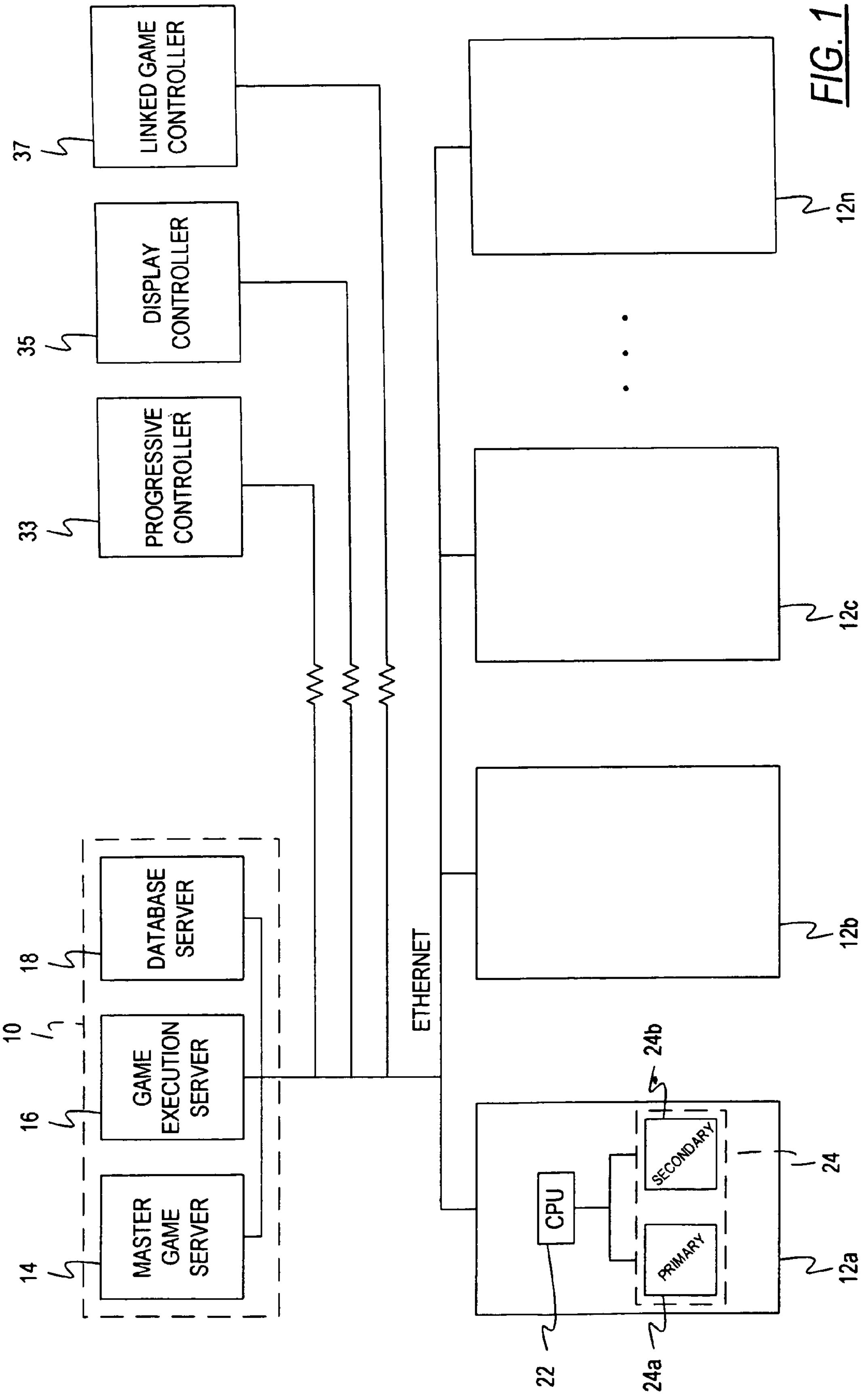
FIG. 1 is a block diagram of a centralized gaming system embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, there is depicted a centralized gaming system comprising a central server system 10 and a plurality of remote display terminals $\mathbf{12}_{a,b,c, \ldots n}$. The remote display terminals are identified hereafter by the reference numeral 12, whether referring to one terminal or multiple terminals. The central server system 10 includes a master game server 14, a multi-user game execution server or play engine 16, and database server 18. The servers 14, 16, and 18 may be physically housed in separate boxes externally linked to each other by transmission lines or wireless technology, or may be physically housed in a common box and internally linked by wires and/or computer bus architecture, or may run on the same hardware.

The plurality of remote display terminals 12 are linked to each other and the central server system 10 by a high-speed local or wide area network using a data transfer protocol such as 100Base-T Ethernet or Gigabit Ethernet, which support data transfer rates of 100 megabits per second and 1 gigabit per second, respectively. Alternatively, the remote display terminals 12 and the central server system 10 may each be outfitted with transceivers that support two-way wireless communication. Each remote display terminal 12 is assigned a respective permanent identification number (PIN) for identifying the terminal 12 to the central server system 10 and allowing the central server system 10 to address the terminal 12.

The master game server 14 stores master copies of all games of chance available for play on the remote display terminals 12. The games of chance may, for example, include slots, poker, blackjack, keno, and bingo. The games are preferably stored in nonvolatile, read-only memory such as a hard drive, CD, DVD, etc.

Figure 2:
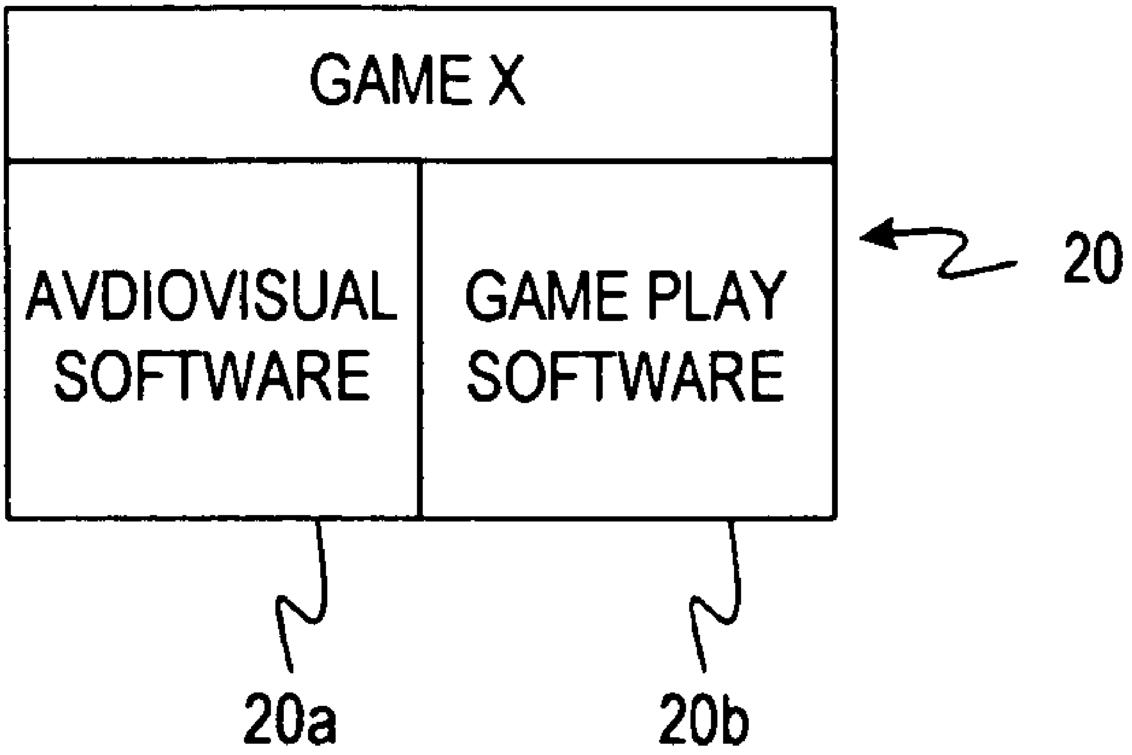
FIG. 2 is a block diagram of a game available for play on the centralized gaming system.

As best shown in FIG. 2, each game of chance 20 may be defined as including two components: executable audiovisual software 20*a* and executable game play software 20*b* The audiovisual software 20*a* includes all audiovisual routines of the game 20 and all game-related I/O functions except for peripheral I/O functions that are not game specific. The audiovisual routines selectively play audio and visual resources to manage the content of visual images displayed by a remote display terminal 12 on which the routines are executed and the content of sounds emitted from speakers of the terminal 12. The game play software 20*b*, which includes underlying game play routines involving math tables, a random number generator, metering, auditing, etc., manages the game play execution for the game 20. The outcome randomly selected by the game 20 is stored in the database server 18. Referring back to FIG. 1, in response to a player's request at one of the remote display terminals 12 to play a game, the master game server 14 downloads the audiovisual software 20*a* for that game to the requesting terminal 12 and loads the game play software 20*b* for that game into the game execution server 16.

The game execution server 16 contains the game play software of all games currently selected for play (i.e., games in session) at the remote display terminals 12. As stated above, the game play software is loaded from the master game server 14 into the game execution server 18. If the same game is selected for play at more than one of the remote display terminals 12 at the same time, the game play software utilizes true multi-user procedures so that only one copy of the game play software for that game need be loaded into the game execution server 16.

The database server 18 stores any data to be maintained and used to generate reports. Such data may, for example, include live and historical game activity data and accumulated accounting meters. The game activity data includes the outcomes randomly selected by the games played on each terminal 12. The accounting meters store credits in, credits out, credits played, credits won, etc. for each of the remote display terminals 12. The data residing in the database server 18 may be marked with the PIN of the terminal 12 that generated the data. The database server 18 may, in turn, include an open interface for player tracking or generating audit reports. The audit reports may be organized by record type, terminal PINs, game name, game type (slots, poker, keno, bingo, etc.), or some other criteria.

The multi-game remote display terminal 12 allows a player at the terminal 12 to play any of the games of chance stored in the master game server 14. For example, if the master game server 14 contains eighty-seven slot games, ten poker games, one blackjack game, one keno game, and one bingo game, any of these one hundred games may be played at each remote display terminal 12 even if the same game is already being played at another one of the remote display terminals 12. Because the central system 10 is a true "server" of game software utilizing multi-user procedures, the same game or different games can be simultaneously played on different ones of the remote gaming terminals 12. Each time a game is selected for play on one of the remote display terminals 12, the game play software for the selected game is loaded from the master game server 14 into the game execution server 16 and run on the game execution server 16. If the same game is selected for play on multiple terminals 12 at the same time, the game play software for the selected game is merely loaded into the game execution server 16 the first time the game is selected. The game play software utilizes multi-user procedures to accommodate players at different terminals 12 who wish to play the same game at the same time. In an alternative embodiment in which the game play software does not utilize multi-user procedures, the game play software for the selected game is loaded into and run on the game execution server 16 each time the game is selected such that multiple copies of the game play software for the same game are simultaneously running on the game execution server 16.

The remote display terminal 12 includes a central processing unit (CPU) 22 and memory structure 24. The CPU 22 includes the terminal's operating system, which is responsible for managing general peripheral I/O functions such as bill validators, coin mechanisms, printers, hoppers, etc. The memory structure 24 preferably includes a primary storage unit 24*a* and a secondary storage buffer 24*b*. The primary storage unit 24*a* may be battery-backed random access memory. The secondary storage buffer 24*b* may be a hard drive or disc storage used only for buffering/caching. The secondary storage buffer 24*b* contains the audiovisual software 20*a* (see FIG. 2) for the last N number of games selected for play at the associated terminal 12, where N depends upon storage capacity. For example, the storage buffer 24*b* may contain the audiovisual software for the last ten games selected for play at the associated terminal 12. Alternatively, the storage buffer 24*b* may contain sufficient storage capacity to contain the audiovisual software of all the games stored in the master game server 14.

After a player at a remote display terminal 12 has redeemed any credits remaining on terminal 12 and the terminal 12 has remained idle for a predetermined period of time ranging from a few seconds to a few minutes, the remote display terminal 12 may be configured to notify prospective players as to the games available for play on the remote display terminal 12. Toward that end, the remote display terminal 12 displays a game selection menu with a plurality of game selection indicia. If the remote display terminal 12 has not remained idle for the predetermined period of time, instead of the game selection menu the terminal 12 may display the primary screen of the last game played on the terminal 12.

To play one of the games available for play on the remote display terminal 12, a new player selects one of the game selection indicia on the game selection menu. If the video display of the remote display terminal 12 is outfitted with a touch screen, the player makes this selection by touching the video display at the location of the game selection indicia for the game the player wishes to play. Alternatively or in addition, the remote display terminal 12 may include physical lighted push-buttons or other means for selecting the game selection indicia. The push-buttons are arranged relative to the game selection indicia in such a way that visually associates the push-buttons with respective ones of the game selection indicia.

In response to selecting one of the game selection indicia, the remote display terminal 12 sends a message to the master game server 14 identifying the sending terminal's PIN and the selected game (including the version of any audiovisual software residing in the secondary storage buffer 24*b*). If the audiovisual software for the selected game is buffered in the secondary storage buffer 24*b* and the master game server 14 verifies that the buffered version matches the version stored in the master game server 14, the master game server 14 loads the game play software for the selected game into the game execution server 16 and directs the remote display terminal 12 to load the buffered audiovisual software from the secondary storage buffer 24*b* into the primary storage unit 24*a*.

If the correct version of the audiovisual software is not buffered in the secondary storage buffer 24*b*, the master game server 14 may immediately update any buffered version with the correct version by downloading the correct version of the audiovisual software to the secondary storage buffer 24*b* of the appropriate remote display terminal 12. Alternatively, the master game server 14 may direct the remote display terminal 12 to inform the player that the selected game is temporarily unavailable and implement the update process according to a predefined schedule. The schedule may call for updates on all or groups of the remote display terminals 12 at predetermined times, such as during off-peak hours.

With the game play software loaded into the game execution server 16 and the buffered audiovisual software loaded into the primary storage unit 24*a*, the game execution server 16 proceeds to execute the game play software for the selected game. Initially, the game execution server 16 directs the operating system of the remote display terminal 12 to execute an audiovisual routine that will display the main screen of the selected game. If, for example, the selected game includes a multi-line, five-reel video slot game, the main screen may include five symbol-bearing reels, game session meters, and various on-screen "soft" buttons for placing wagers, cashing out, obtaining help, and initiating play. The game session meters vary from game to game but with respect to slots, for example, may include credits, line bet, total bet, and paid.

Figure 3:
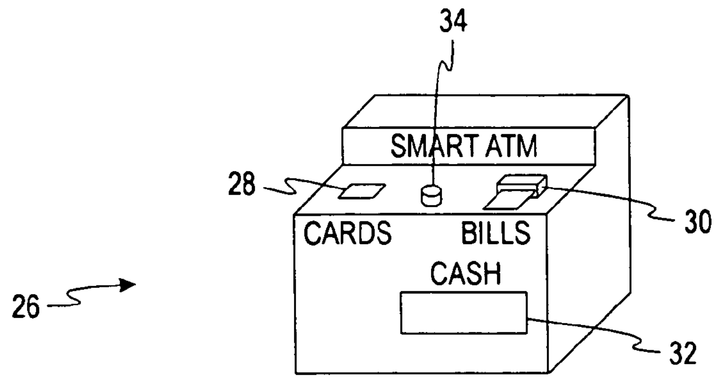
FIG. 3 is an isometric view of a smart card terminal employed in the centralized gaming system.

Next, the player places a wager at the remote display terminal 12. To be able to place a wager, the player must add credits to the "credits" meter for the remote display terminal 12 on which the player wishes to play. Toward that end, the centralized gaming system preferably promotes wagering without cash, i.e., cashless gaming, to minimize the need for service personnel to visit the remote display terminals 12. To realize wagering without cash, smart card terminals 26 of the type illustrated in FIG. 3 are interspersed throughout the gaming establishment. Alternatively, cashless gaming may be accomplished by other means such as tickets/coupons, magnetic cards, or the like.

Referring briefly to FIG. 3, the smart card terminal 26 includes a smart card reader/dispenser 28, a cash acceptor 30, and a cash dispenser 32. To obtain a smart card prior to playing at one of the remote display terminals 12, the player deposits cash (bills) into the cash acceptor 30. After the desired amount of cash has been deposited, the player presses a vend card button 34 to cause the terminal 26 to dispense a smart card from the smart card dispenser 28. The smart card is embedded with a microcontroller having a memory storing funds corresponding to the amount of cash deposited into the smart card terminal 26. The use of smart cards for cashless gaming is advantageous over other cashless media, such as credit cards, because smart cards generally heighten a player's awareness of funds spent.

In an alternative embodiment, the smart card not only serves as a funds handling card but also serves as a player tracking card. To be able to track the player, the smart card terminal may include a player interface, such as a keyboard and/or a touch screen, that allows the player to enter player tracking information. The player tracking information may be limited to personal identification information or may include additional details such as play data as disclosed in U.S. Pat. No. 5,179,517 to Sarbin et al. and player preference data as disclosed in U.S. Pat. No. 6,110,041 to Walker et al. Instead of vending new smart cards at the smart card terminal 26, the gaming system may require the player to obtain a new smart card directly from a registration authority in the gaming establishment, which acquires the player tracking information prior to tendering the smart card. The player tracking information is preferably stored in a personal record residing in the database server 18 in FIG. 1 or a separate player tracking database coupled to the open interface of the database server 18. The smart card stores a personal identifier for addressing and accessing this personal record. If the smart card terminal 26 only accepts smart cards but does not vend new cards, then the player inserts his or her smart card (obtained from the registration authority) into the smart card reader 28 prior to depositing cash into the cash acceptor 30.

Referring back to FIG. 1, to place a wager at the remote display terminal 12, the player inserts his or her smart card into a card reader (see FIG. 4) of the remote display terminal 12. The remote display terminal 12, in turn, sends a message to the game execution server 16 identifying the sending terminal's PIN, the personal identifier on the smart card, and the amount of funds on the smart card. The personal identifier is used to address and access the player's personal record in the player tracking database and thereby implement player tracking functions in a manner heretofore known in the art. The game execution server 16 updates its game session meters based on the amount of funds on the smart card, and then directs the operating system of the remote display terminal 12 to correspondingly update the terminal's on-screen game session meters. The actual funds may still reside on the smart card, which is locked in the terminal's card reader, but the amount of funds is visually represented on the main screen so the player is aware of the amount of funds on the card and available for game play. Alternatively, the funds may actually be electronically transferred from the smart card to the game execution server 16.

Next, the player enters a wager amount via the touch screen or push-buttons on the remote display terminal 12. If the selected game includes a multi-line, five-reel video slot game, the player's wager includes the number of pay lines to play and the wager amount per pay line. The remote display terminal 12 displays the number of pay lines played on the terminal's on-screen "lines" meter, the wager amount per pay line on the "bet per line" meter and the total wager amount on the "total bet" meter.

To spin the reels simulated on the video display, the player presses a "play" or "spin reels" button on the remote display terminal 12. The remote display terminal 12, in turn, sends a message to the game execution server 16 identifying the terminal's PIN, the number of pay lines played, the wager amount per pay line, and the instruction to play. The game execution server 16 updates its game session meters and then directs the operating system of the remote display terminal 12 to correspondingly update the terminal's on-screen game session meters. Using a random number generator (RNG) in the game play software, the game execution server 16 randomly selects an outcome for the selected game. The outcome may, for example, be represented by a particular set of reel stop positions and a payout for a symbol combination along each active pay line. The outcome is randomly selected from a plurality of possible outcomes. The payouts depend upon the probability of occurrence of the respective outcomes such that the lower the probability of occurrence of an outcome, the higher the payout awarded for that outcome. The payout may, of course, range from zero to a value much greater than zero. A pay table identifies the non-zero payouts and the outcomes corresponding to those payouts and may be accessed by pressing a "pay table" button on the remote display terminal 12.

After randomly selecting an outcome, the game execution server 16 updates its game session meters based on the payout for that outcome. To report the outcome to the player, the game execution server 16 sends a message to the remote display terminal 12 identifying the outcome. Based on the outcome, the remote display terminal 12 executes audiovisual routines that will display a simulation of spinning reels, stop the reels at the stop positions corresponding to the selected outcome, and update the values in the terminal's on-screen game session meters to correspond to the server's game session meters.

The above-described process for executing a game selected for play on the remote display terminal 12 is repeated until the player wishes to stop playing the game and "cash out" any credits remaining on the "credits" meter. To cash out, the player presses a "collect" button on the remote display terminal 12. The remote display terminal 12, in turn, sends a message to the game execution server 16 identifying the sending terminal's PIN and the cash out instruction. The game execution server 16 responds by updating its game session meters, modifying the amount of funds on the card to correspond to the "credits" meter, and instructing the terminal's card reader to unlock and dispense the smart card. The database server 18 updates its accumulated accounting meters based on the completed game session and may, from time to time, also update its accounting meters during a game session. If funds remain on the smart card, the player can insert the smart card into a smart card terminal 26 of the type depicted in FIG. 3 and collect the funds in the form of cash dispensed from the cash dispenser 32.

In one embodiment, the remote display terminals 12 only permit cashless gaming and therefore contain no bill validators, no coin mechanisms, and no hoppers. If the player uses up all the funds on the smart card, the smart card is automatically dispensed from the card reader so that the player can take the card to a smart card terminal 26 (see FIG. 3) and load additional funds onto the card. In an alternative embodiment, the remote display terminals 12 include bill and/or coin acceptors for the sole purpose of loading funds onto the card should the player use up the existing funds. With this arrangement, the player need not leave the remote display terminal 12 to reload. In yet another alternative embodiment, the bill and/or coin acceptors can additionally be employed to directly load funds onto the "credits" game session meter for the remote display terminal 12.

In addition to being linked to the remote display terminals 12, the central server system 10 is optionally linked by the local or wide area computer network to a progressive controller 33, a display controller 35, and/or a linked game controller 37. The progressive controller 33 establishes a common progressive jackpot based on wagers placed at the remote display terminals 12 and awards the jackpot to a player at one of the terminals 12 based on predetermined criteria such as a highly unlikely outcome triggered by that terminal 12. The display controller 35 may control various overhead video displays for displaying the amount of a progressive jackpot, displaying a shared bonus game or bonus amount triggered by one of the remote display terminals 12, reproducing the images appearing on one of the terminals 12 such as a terminal 12 in a bonus mode, attracting attention to the terminals 12 or a particular bank of the terminals 12, or just generally increasing the level of excitement in the gaming establishment. The display controller 35 may also selectively illuminate various overhead non-video signs such as neon signs.

The linked game controller 37 may be integrated into the game execution server 16 or may be a separate hardware component linked to the game execution server 16. The linked game controller 37 preferably allows individual terminals 12 or groups of terminals 12 to play a common game feature in which the terminals compete against each other or play together toward a common goal. If the terminals compete against each other, each terminal may be assigned a respective visual element such as a character, symbol, or the like. For example, if the visual elements are horses, race cars, or runners, the participating terminals may complete against each other in a race where movement of the visual elements along the race track is entirely random or based on subsequent wagers or outcomes on the participating terminals. If the terminals play together toward a common goal, achievement of that goal may generate a bonus shared by the participating terminals. The bonus may be distributed to the participating terminals in equal or unequal shares, depending upon the extent to which each terminal contributed toward the achievement of the common goal. The common game feature may be depicted on a large central display and/or participating terminal displays under the control of the linked game controller 37.

Participation in the common game feature by a terminal 12 may be triggered by either the linked game controller 37 or the terminal 12. The linked game controller 37, for example, may trigger participation at random or predetermined times of day. The terminal 12 may trigger participation of that terminal in the common game feature in response to a special start-feature outcome generated by the game played via the terminal 12, or a player's election to participate in the common game feature. Also, one terminal's participation may cause one or more other terminals to also participate in the common game feature.

Figure 4:
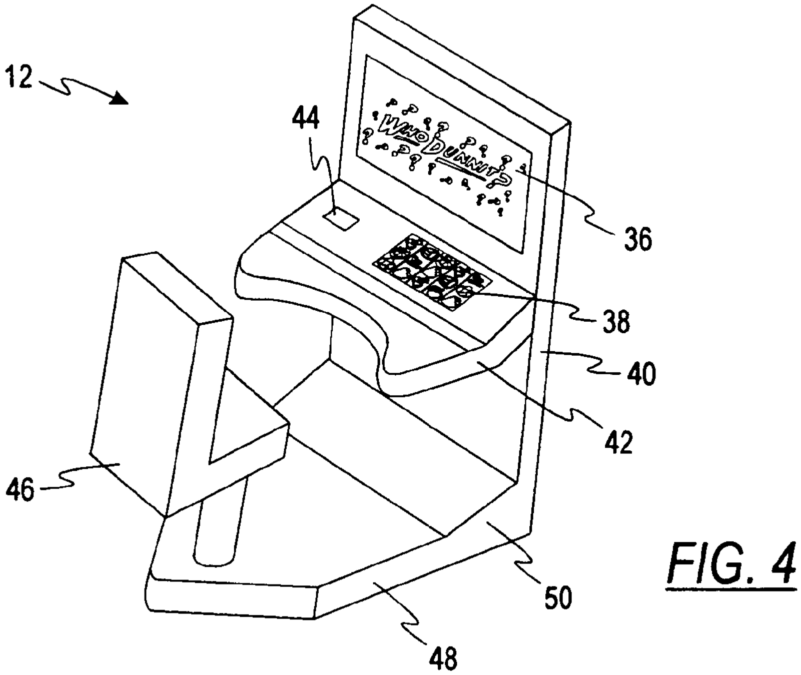
FIG. 4 is an isometric view of a remote display terminal employed in the centralized gaming system.
Figure 5:
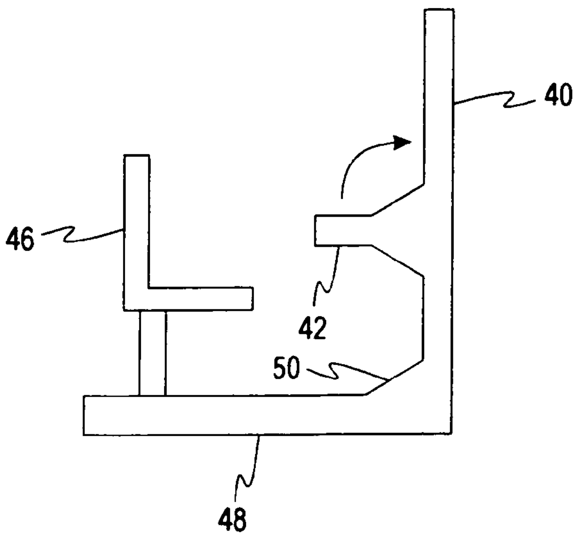
FIG. 5 is a side view of the remote display terminal.

FIGS. 4 and 5 illustrate one embodiment of the remote display terminal 12. In this embodiment, the remote display terminal 12 includes upper and lower displays 36 and 38. The upper display 36 is preferably a flat panel video display mounted to a vertical support 40 and selected from a group consisting of a liquid crystal display (LCD), plasma display, field emission display, digital micromirror display (DMD), dot matrix display, vacuum florescent display (VFD), etc. While the remote display terminal 12 is in an attract mode, the upper video display 36 may be used to depict billboard indicia for attracting attention to the terminal 12. While a player is playing a game at the terminal 12, the upper video display 36 may continue to display the billboard indicia, or may alternatively display special effects or secondary game play features.

The lower display 38 may be any of the aforementioned video displays, a CRT, or a plurality of mechanical slot reels viewable through a display window. If the lower display 38 is a video display, it is preferably outfitted with a touch screen. While a player is playing a game at the terminal 12, the lower display 38 displays primary game play features (e.g., slot reels, poker cards, keno board, bingo board, etc.) according to messages from the game execution server 16 identifying routines of the terminal's audiovisual software that should be executed (see FIG. 1).

The remote display terminal 12 includes a generally horizontal support 42 for housing the lower display 38, a smart card reader 44, and the electronics of the CPU 22 and memory structure 24 discussed in connection with FIG. 1. The horizontal support 42 is preferably hinged to the vertical support 40 such that it can be rotated upwardly as shown by an arrow in FIG. 5 to permit access the electronics within the horizontal support 42 via an access panel on a lower side of the support 42.

The remote display terminal 12 also includes a swivel seat 46 mounted to a horizontal seat support 48. The seat support 48 contains a footrest 50 beneath the horizontal support 42 and extends forwardly from the vertical support 40.

The present invention has several advantages. First, because the central server system 10 in FIG. 1 executes the game play software, malfunctions or unplanned power losses on the remote display terminals 12 generally do not affect game outcomes. The central server system 10 itself is redundantly protected from such problems. Further, game development is simplified.

Second, because historical data is centrally stored in the database server 18 in FIG. 1, the central server system 10 facilitates generation of reports concerning the activity of the remote display terminals 12. Using off-the-shelf database tools manufactured by such companies as Oracle Corporation, such reports can be easily generated and organized as desired.

Third, the present invention facilitates modification to the games available for play via the remote display terminals 12. Because games are centrally stored on the master game server 14, a game is easily changed by simply updating the software residing in the master game server 14. Modifications or updates do not require the entire software to be installed in each of the remote display terminals 12 in what would be a time-consuming process subject to elevated security concerns.

Figure 6:
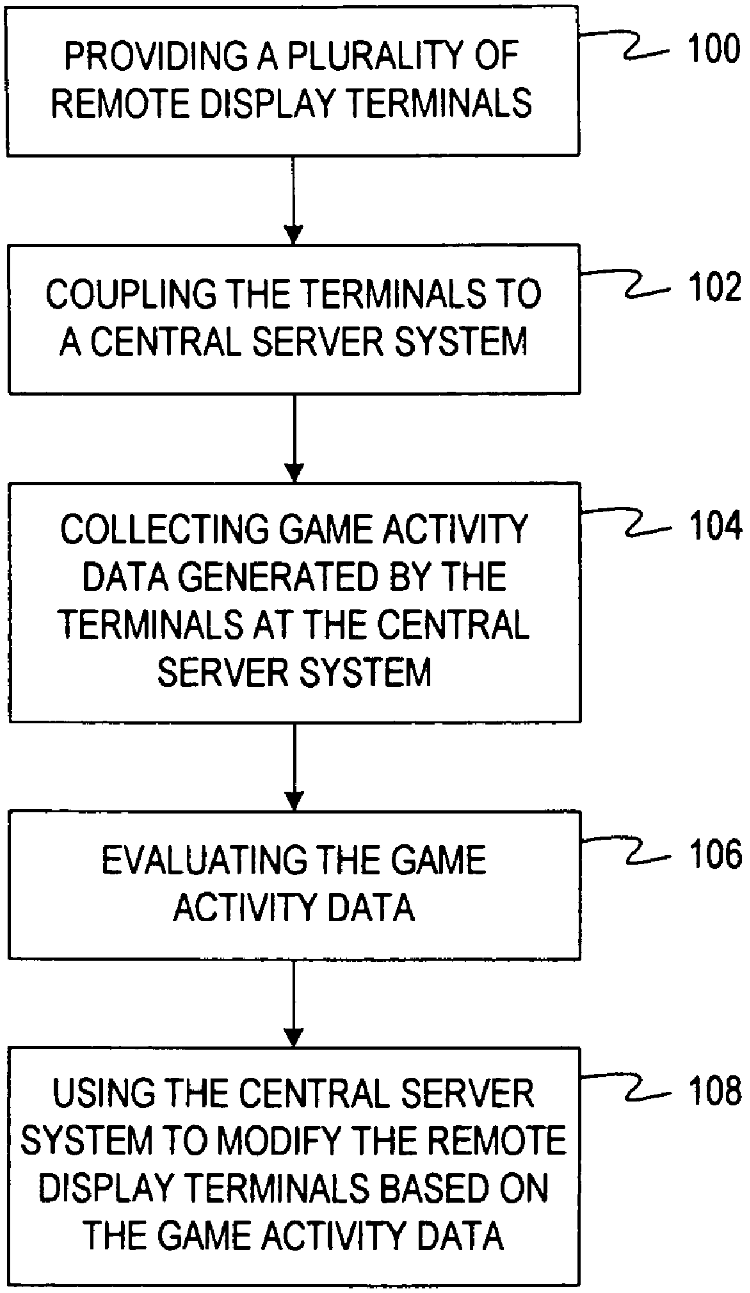
FIG. 6 is a flow diagram of a method of configuring remote display terminals in the centralized gaming system to maximize earnings.

Fourth, due to the ease of modifying the games available for play via the remote display terminals 12, the remote display terminals 12 may be configured to maximize earnings using the method depicted in FIG. 6. More specifically, the remote display terminals 12 may be arranged in a plurality of banks (groups) coupled to the central server system (steps 100 and 102). The terminals 12 in the same bank may have a common characteristic, such as the type of game (slots, poker, bingo, keno, etc.), game theme, minimum wager for playing a game, volatility of a game, payback percentage, etc. Based on the historical data collected in the database server 18 (step 104), it may be determined that certain banks perform better, e.g., are played more frequently or earn more money, than other banks. This determination may be explained by market research and/or by evaluating the performance statistics of certain games when placed in different banks (step 106). Using a graphical user interface at the master game server, the master game server 14 may then be configured to modify the selection, content, and/or math of games available to each terminal 12 according to predetermined criteria, such as performance (e.g., frequency of play or money earnings), time, location of terminal, or various player or casino preferences (step 108). If, for example, it is determined that low volatility slot games with a low minimum wager (e.g., 5 cents) are most popular when available in Bank X near the front door of the gaming establishment between the hours of 6 pm and 11 pm, then the master game server 14 may be configured to modify the games available for play via the terminals 12 in Bank X to be low volatility slot games with a low minimum wager between 6 pm and 11 pm. The master game server 14 is preferably linked to a display for graphically presenting the programmed configuration to an operator and allowing the operator to easily modify the configuration. Modifications can preferably be done not only on a bank-by-bank basis, but also a terminal-by-terminal basis. Thus, the earnings generated by the remote display terminals 12 can be maximized.

Fifth, the remote display terminals 12 may similarly be configured for target marketing. For example, terminals 12 near the front door may offer a new game to bring the game to the attention of prospective players and get players acquainted with the game.

Sixth, to facilitate a player's ability to play a variety of games on a remote display terminal 12 without having to search the casino floor for his or her preferred game, the terminal 12 may be configured to offer a large number of games. By buffering the audiovisual software but not the game play software for each game, the remote display terminal 12 may be constructed to have sufficient memory capacity to accommodate the large number of games. To the extent that the games on the remote display terminal 12 have a wide range of characteristics, the games may be arranged in a heirarchy of primary and secondary game selection menus to emphasize those games that will maximize earnings as discussed above.

Seventh, the remote display terminals 12 are reliable and require minimal maintenance because they have few parts that are easily repaired if a problem should occur.

While the present invention has been described with reference to one or more particular embodiments, those skilled in the art will recognize that many changes may be made thereto without departing from the spirit and scope of the present invention.

For example, the game of chance selected for play on a remote display terminal 12 may include multiple stages involving more interaction between the game and the player than just the initial wager. Video draw poker, for example, requires the player to select which cards to hold and which cards to discard after the initial deal. Likewise, many slot games include bonus features triggered by certain outcomes in the main slot game and requiring the player to select from multiple game playing elements. Such interactive games require multiple messages between the game execution server 16 and the remote display terminal 12 where the game execution server 16 may need to update its game session meters in mid-game, randomly select an outcome, and remotely request the operating system of the terminal 12 to change its display based on the outcome more than once during the game.

In addition, instead of buffering the audiovisual software in the secondary storage buffer 24*b* for each of the games available for play on a remote display terminal 12 and then loading the audiovisual software for a selected game from the secondary storage buffer 24*b* into the primary storage unit 24*a*, the audiovisual software for the selected game may be loaded into the primary storage unit 24*a* from the master game server 14 in response to a player's selection of that game. The secondary storage buffer 24*b* is therefore eliminated, but at the expense of a more time-consuming download from the master game server 14.

Further, instead of executing the game play software in the game execution server 16, the game play software may be downloaded from the master game server 14 to a requesting remote display terminal 12 and locally executed by the terminal 12. In other words, the game execution server 16 in FIG. 1 can be eliminated, and the game play software can reside in and be executed locally by the terminal 12. Whether the game play software is executed remotely by the game execution server 16 in FIG. 1 or locally by the terminal 12, the terminal 12 already includes a central processing unit with memory such that few additional components would be required for the terminal 12, and not the central game execution server 16, to locally execute game play software.

Each of these embodiments and obvious variations thereof is contemplated as falling within the spirit and scope of the claimed invention, which is set forth in the following claims.

What is claimed is:

1. A centralized gaming system, comprising:

a central server system storing a plurality of games of chance, the central server providing the plurality of games to a plurality of remote display terminals linked to the central server; and at least one of the remote display terminals including a display, a processor, and an accounting meter, wherein in response to any credits on the accounting meter being redeemed and the at least one remote display terminal being idle for a predetermined period of time, the processor causes the display to display a plurality of game selection indicia corresponding to the plurality of games provided by the central server, and in response to one of the games from the central server being selected for play according to the game selection indicia displayed at the at least one remote display terminal, the processor executes software for the selected game to randomly select an outcome and the outcome is visually represented on the display of the one remote display terminal, the processor causing the display of the one remote display terminal to display the selected game until any credits on the accounting meter have been redeemed and the at least one remote display terminal has been idle for the predetermined period of time.

2. The gaming system of claim 1, wherein in response to one of the games being selected for play at the at least one remote display terminal at least some software for the selected game is downloaded from the central server system to the at least one remote display terminal and is selectively executed at the at least one remote display terminal.

3. The gaming system of claim 2, wherein the at least some software executed at the at least one remote display terminal is audiovisual software for visually representing the outcome on the display of the one of the display terminals.

4. The gaming system of claim 1, wherein in response to one of the games being selected for play at the at least one remote display terminal, at least some software for the selected game is executed at the central server system.

5. The gaming system of claim 4, wherein the at least some software executed at the central server system is game play software for randomly selecting an outcome.

6. The gaming system of claim 1, wherein the software includes a random number generator for randomly selecting the outcome.

7. The gaming system of claim 1, wherein the at least one remote display terminal includes upper and lower video displays, the upper video display depicting billboard indicia, the lower display visually representing the outcome.

8. The gaming system of claim 7, wherein the upper display is a flat panel display selected from a group consisting of a liquid crystal display (LCD), plasma display, field emission display, digital micromirror display (DMD), dot matrix display, and vacuum florescent display (VFD).

9. A method of executing a game of chance, comprising:

providing a central server system storing a plurality of games of chance and providing the plurality of games to a plurality of remote display terminals linked to the central server, at least one of the remote display terminals including a display, a processor, and an accounting meter;

in response to any credits on the accounting meter of the at least one remote display terminal being redeemed and the at least one remote display terminal being idle for a predetermined period of time, displaying, using the processor, a plurality of game selection indicia on the display, the plurality of game selection indicia corresponding to the plurality of games provided by the central server;

receiving, according to the game selection indicia at the at least one display terminal, a player's selection of one of the games from the central server to be played at the at least one display terminal;

executing, using the processor, software for the selected game to randomly select an outcome;

visually representing the outcome on a display of the at least one display terminal; and displaying, using the processor, the selected game on the display until any credits on the accounting meter of the at least one remote display terminal have been redeemed and the at least one display terminal has been idle for the predetermined period of time.

10. The method of claim 9, wherein the step of executing the software includes generating a random number for randomly selecting the outcome.

11. The method of claim 9, further including downloading at least some software for the selected game to the at least one display terminal, and selectively executing the software for the selected game at the at least one display terminal.

12. The method of claim 11, wherein the at least some software executed at the at least one display terminal is audio-visual software for visually representing the outcome on the display of the one of the display terminals.

13. The method of claim 9, further including executing at least some software for the selected game at the central server system.

14. The method of claim 13, wherein the at least some software executed at the central server system is game play software for randomly selecting an outcome.

* * * * *